(12) United States Patent
Yang et al.

(10) Patent No.: US 10,042,495 B2
(45) Date of Patent: Aug. 7, 2018

(54) TOUCH DISPLAY PANEL, MANUFACTURING METHOD THEREOF, DRIVING METHOD THEREOF AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ming Yang, Beijing (CN); Xue Dong, Beijing (CN); Xiaochuan Chen, Beijing (CN); Haisheng Wang, Beijing (CN); Yingming Liu, Beijing (CN); Yanchen Li, Beijing (CN)

(73) Assignees: BOE TECHNOLOGY GROUP CO., LTD, Beijing (CN); BEIJING BOE OPTOELECTRONICS TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 15/217,049

(22) Filed: Jul. 22, 2016

(65) Prior Publication Data
US 2017/0060302 A1    Mar. 2, 2017

(30) Foreign Application Priority Data
Aug. 24, 2015    (CN) .......................... 2015 1 0526143

(51) Int. Cl.
G06F 3/045    (2006.01)
G06F 3/044    (2006.01)

(52) U.S. Cl.
CPC .... G06F 3/044 (2013.01); *G06F 2203/04103* (2013.01)

(58) Field of Classification Search
CPC ...................................................... G06F 3/044
See application file for complete search history.

(56) References Cited

U.S. PATENT DOCUMENTS 7,592,981 B2 * 9/2009 Maeda ................. G09G 3/3233
                                                    345/75.2
9,710,090 B2 * 7/2017 Choi ...................... G06F 3/0412
(Continued)

FOREIGN PATENT DOCUMENTS

CN          201590059 U       9/2010
CN          103713792 A       4/2014
(Continued)

OTHER PUBLICATIONS

First Chinese Office Action dated Jul. 12, 2017.

*Primary Examiner* — Erin M File
(74) *Attorney, Agent, or Firm* — Dilworth & Barrese, LLP; Michael J. Musella, Esq.

(57) ABSTRACT

A touch display panel, a manufacturing method and a driving method thereof and a touch display device are provided. The touch display panel includes an array substrate, a plurality of subpixels and a driver chip for outputting a signal to cathode layers in each subpixel group. Each subpixel includes an anode layer, a light-emitting layer and a cathode layer; one subpixel group is formed by at least two adjacent subpixels and cathode layers of the subpixels in a same subpixel group are connected. The driver chip is electrically connected with a cathode layer of at least one subpixel in the subpixel group through a conductive wire, and configured to output a common voltage signal to cathode layers in each subpixel group in a display period of one frame and to output a touch drive signal to the cathode layers in each subpixel group in a touch period of one frame.

11 Claims, 5 Drawing Sheets

(56) References Cited

U.S. PATENT DOCUMENTS

| | | | | |
|---|---|---|---|---|
| 2014/0009412 A1* | 1/2014 | Ahn | ............ | G06F 3/0304 |
| | | | | 345/173 |
| 2014/0210767 A1* | 7/2014 | Hur | ............ | G06F 3/0412 |
| | | | | 345/174 |
| 2015/0084946 A1* | 3/2015 | Shim | ............ | G09G 3/3258 |
| | | | | 345/212 |
| 2015/0332628 A1* | 11/2015 | Ren | ............ | G09G 3/3258 |
| | | | | 345/690 |
| 2016/0103513 A1* | 4/2016 | Yang | ............ | G06F 3/041 |
| | | | | 345/175 |
| 2016/0148981 A1* | 5/2016 | Matsueda | ............ | H01L 27/3218 |
| | | | | 257/40 |
| 2016/0266689 A1* | 9/2016 | Yang | ............ | G06F 3/0412 |
| 2016/0307978 A1* | 10/2016 | Liu | ............ | H01L 51/56 |
| 2017/0117334 A1* | 4/2017 | Guo | ............ | H01L 27/3216 |

FOREIGN PATENT DOCUMENTS

| | | |
|---|---|---|
| CN | 104536632 A | 4/2015 |
| CN | 104835454 A | 8/2015 |
| CN | 104850268 A | 8/2015 |
| CN | 104850270 A | 8/2015 |

* cited by examiner

TOUCH DISPLAY PANEL, MANUFACTURING METHOD THEREOF, DRIVING METHOD THEREOF AND TOUCH DISPLAY DEVICE

TECHNICAL FIELD

Embodiments of the present disclosure relate to a touch display panel, a manufacturing method and a driving method of the touch display panel, and a touch display device.

BACKGROUND

Capacitive touch displays are a new generation of market-oriented touch displays following after resistive touch displays. The performances of the capacitive touch displays have a qualitative leap compared with the products of the previous generation. Regarding to the capacitive touch displays, not only the reaction is sensitive but also multi-touch is supported, so that the playability and the operability of touch products can be greatly improved. On the other hand, organic light-emitting diodes (OLEDs) are widely applied due to the characteristics of autoluminescence, high brightness, wide viewing angle, high contrast, flexibility, low power consumption, etc. OLED displays become a new generation of displays, have begun to gradually replace the traditional liquid crystal displays, and are widely applied in cell phone screens, computer monitors, full-color TVs, etc.

SUMMARY

Embodiments of the present disclosure provides a touch display panel, a manufacturing method and a driving method of the touch display panel, and a touch display device, for simplifying the manufacturing process of the touch display panel and reducing the production costs of the touch display panel.

In a first aspect, at least one embodiment of the present disclosure provides a touch display panel, which includes: an array substrate; a plurality of subpixels arranged in a matrix and disposed on the array substrate and a driver chip configured to output a signal to cathode layers in each subpixel group. Each subpixel includes an anode layer, a light-emitting layer and a cathode layer which are sequentially disposed on the array substrate; the anode layers of the subpixels are independent from each other; at least two adjacent subpixels form a subpixel group; and the cathode layers of the subpixels in a same subpixel group are connected with each other. The driver chip is electrically connected with the cathode layer of at least one subpixel in the subpixel group through a conductive wire; in a display period of a frame, the driver chip is configured to output a common voltage signal to the cathode layers in each subpixel group; and in a touch period of the frame, the driver chip is configured to output a touch drive signal to the cathode layers in each subpixel group.

In a second aspect, at least one embodiment of the present disclosure provides a method for manufacturing a touch display panel, which includes: forming an array substrate; forming anode layers of subpixels on the array substrate, so that the anode layers of the subpixels are independent from each other; forming light-emitting layers of the subpixels on the anode layers; forming cathode layers of the subpixels on the light-emitting layers, so that at least two adjacent subpixels form a subpixel group, and the cathode layers of the subpixels in a same subpixel group are connected with each other; and bonding a driver chip, so that the driver chip is electrically connected with the cathode layer of at least one subpixel in the subpixel group through a conductive wire. In a display period of a frame, the driver chip is configured to output a common voltage signal to the cathode layers in each subpixel group; and in a touch period of the frame, the driver chip is configured to output a touch drive signal to the cathode layers in each subpixel group.

In a third aspect, at least one embodiment of the present disclosure provides a method for driving a touch display panel, and the method is used to drive the touch display panel as stated in the first aspect. The driving method includes: dividing a time period of each frame into a display period and a touch period; in the display period, outputting a common voltage signal to cathode layers in each subpixel group; and in the touch period, outputting a touch drive signal to the cathode layers in each subpixel group and determining a touch position according to capacitance variation of the cathode layers in each subpixel group.

In a fourth aspect, at least one embodiment of the present disclosure further provides a touch display device which includes the touch display panel as mentioned in the first aspect.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The current OLED touch display technology mainly involves that: a touch panel is overlapped on a surface of an OLED display panel, so that the OLED display panel can have the touch function. But in such a solution, touch electrodes of the touch panel are formed at the outside of an encapsulated layer of the OLED display panel, and thus this proposal is not conducive to the simplifying of the process of the touch display panel and the reduction of the manufacturing costs of the touch display panel.

Figure 1:
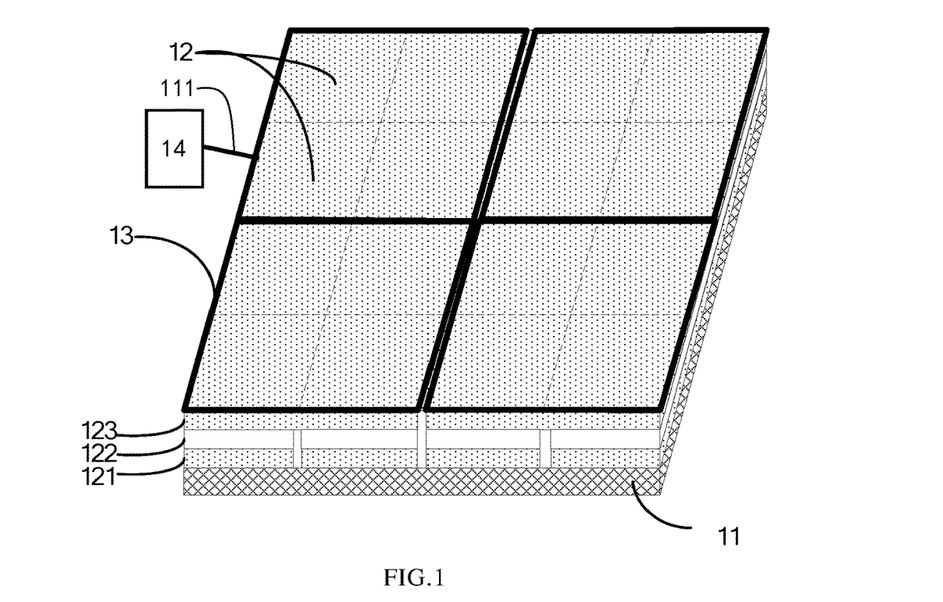
FIG. 1 is a schematic structural view of a touch display panel provided by an embodiment of the present disclosure.

An embodiment of the present disclosure provides a touch display panel. As illustrated in FIG. 1, the touch display panel includes: an array substrate 11 and a plurality of subpixels 12 arranged in a matrix and disposed on the array substrate. Each subpixel 12 includes an anode layer 121, a light-emitting layer 122 and a cathode layer 123 which are sequentially disposed on the array substrate; the anode layers 121 of the subpixels are independent from each other; one subpixel group 13 is formed by at least two adjacent subpixels 12; the cathode layers 123 of the subpixels 12 in the same subpixel group 13 are connected with each other; and the cathode layers 123 of the subpixels 12 in different subpixel groups 13 are not connected. The touch display panel further includes: a driver chip 14 configured to output a signal to the cathode layers 123 in each subpixel group 13. The driver chip 14 is electrically connected with the cathode layer 123 of at least one subpixel in each subpixel group through a conductive wire 111; in the display period of one frame, the driver chip 14 is configured to output a common voltage signal to the cathode layers 123 in each subpixel group 13; and in the touch period of one frame, the driver chip 14 is configured to output a touch drive signal to the cathode layers 123 in each subpixel group 13.

It should be noted that description is given in FIG. 1 by taking the case that one subpixel group includes 4 subpixels as an example, but the case that one subpixel group includes 4 subpixels is only one implementation of the embodiment of the present disclosure and shall not be intended to limit the present disclosure. For example, the driver chip 14 is disposed on the array substrate 11 or is disposed outside the array substrate 11. In at least one embodiment of the present disclosure, for example, the subpixel is an OLED. Certainly, implementations of the subpixel include but not limited to the OLED, and the subpixel may adopt other device including the anode layer, the light-emitting layer and the cathode layer.

The touch display panel provided by the embodiment of the present disclosure includes: an array substrate and a plurality of subpixels arranged in a matrix and disposed on the array substrate. Each subpixel includes an anode layer, a light-emitting layer and a cathode layer sequentially disposed on the array substrate; the anode layers of the subpixels are independent from each other; one subpixel group is formed by at least two adjacent subpixels; and the cathode layers of the subpixels in the same subpixel group are connected with each other. Moreover, the touch display panel further includes a driver chip which is configured to output a signal to the cathode layers in each subpixel group. The driver chip is electrically connected with the cathode layer of at least one subpixel in the subpixel group through a conductive wire; in the display period of one frame, the driver chip is configured to output a common voltage signal to the cathode layers in each subpixel group; and in the touch period of one frame, the driver chip is configured to output a touch drive signal to the cathode layers in each subpixel group. That is to say, in the embodiment of the present disclosure, in the touch period of one frame, the cathode layers in each subpixel group are multiplexed as a touch electrode. Compared with the solution that the touch electrodes are formed at the outside of the encapsulated layer of a display panel, the embodiment of the present disclosure reduces the technological process of independently forming the touch electrodes. Therefore, the embodiment of the present disclosure simplifies the manufacturing process of the touch display panel and reduces the manufacturing costs of the touch display panel.

Figure 2:
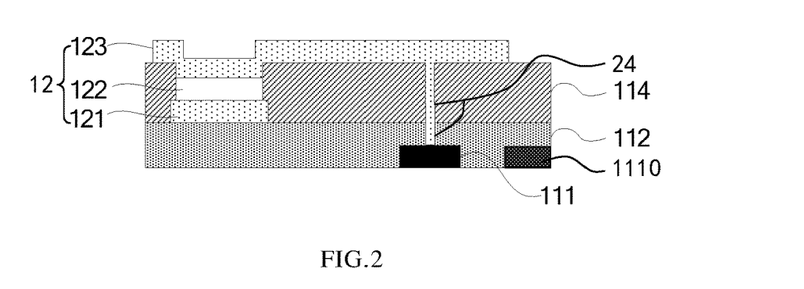
FIG. 2 is a vertical sectional view of a subpixel, in which a cathode layer is electrically connected with a driver chip through a conductive wire, and a corresponding array substrate thereof, provided by an embodiment of the present disclosure.
Figure 3:
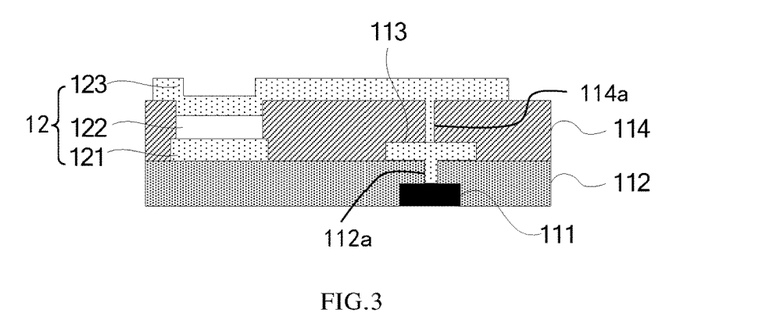
FIG. 3 is a another vertical sectional view of a subpixel, in which a cathode layer is electrically connected with a driver chip through a conductive wire, and a corresponding array substrate thereof, provided by an embodiment of the present disclosure.
Figure 4:
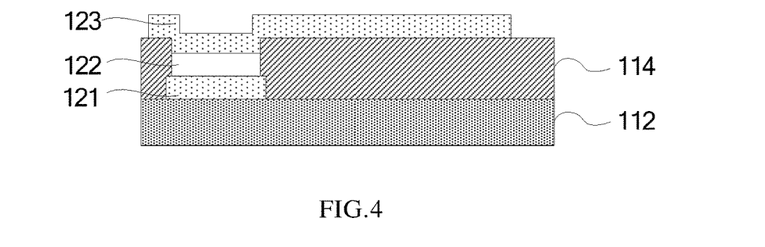
FIG. 4 is a vertical sectional view of a subpixel, in which a cathode layer is not electrically connected with a driver chip, and a corresponding array substrate thereof, provided by an embodiment of the present disclosure.

Illustratively, as illustrated in FIGS. 2, 3 and 4, FIGS. 2 and 3 are vertical sectional views of a subpixel 12, in which a cathode layer is electrically connected with a driver chip through a conductive wire, and a corresponding array substrate 11 thereof, and FIG. 4 is a vertical sectional view of a subpixel 12 and an array substrate 11, in which a cathode layer is not electrically connected with a driver chip through a conductive wire.

For instance, as illustrated in FIG. 2, the conductive wire 111 and a data line 1110 of the array substrate is arranged in the same layer and made from a same material. As the conductive wire and the data line are arranged in the same layer and made from a same material, the conductive wire and the data line of the array substrate is formed by the same patterning process, and hence the technological process of the touch display panel is further simplified.

For instance, as illustrated in FIG. 2, the array substrate, corresponding to the subpixel 12 in which the cathode layer 123 is electrically connected with the driver chip (not shown in FIG. 2) through the conductive wire 111, includes: a planarization layer 112 covering the conductive wire 111 and a pixel defining layer 114 covering the planarization layer 112. The pixel defining layer 114 is disposed between the subpixels 12, so that the anode layers 121 of adjacent subpixels are at least spaced from each other. The cathode layer 123 of the subpixel 12 is connected with the conductive wire 111 via a through hole 24 running through the planarization layer 112 and the pixel defining layer 114.

For instance, as illustrated in FIG. 3, the array substrate, corresponding to the subpixel 12 in which the cathode layer 123 is electrically connected with the driver chip (not shown in FIG. 3) through the conductive wire 111, includes: a planarization layer 112 covering the conductive wire 111, an electric conductor 113 disposed on the planarization layer 112, and a pixel defining layer 114 covering the electric conductor 113. The electric conductor 113 is connected with the conductive wire 111 via a first through hole 112a in the planarization layer 112, and the cathode layer 123 of the subpixel 12 is connected with the electric conductor 113 via a second through hole 114a in the pixel defining layer 114.

For instance, the electric conductor 113 is an island electric conductor. Of course, the electric conductor 113 may also be in other shapes, e.g., be strip-shaped.

As illustrated in FIG. 4, the array substrate, corresponding to the subpixel (not shown in FIG. 4) in which the cathode layer 123 is not electrically connected with the driver chip, includes: a planarization layer 112, and a pixel defining layer 114 which covers the planarization layer 112.

Figure 5A:
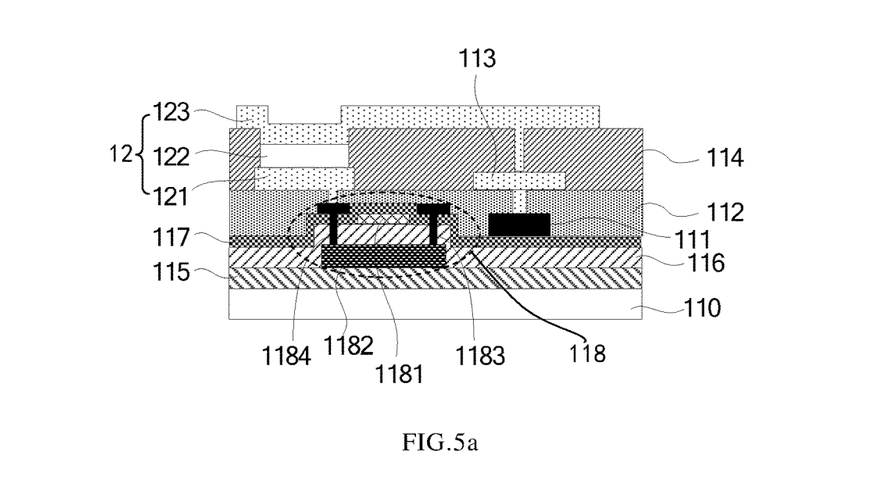
FIG. 5a is another vertical sectional view of a subpixel, in which a cathode layer is electrically connected with a driver chip through a conductive wire, and a corresponding array substrate thereof, provided by an embodiment of the present disclosure.
Figure 5B:
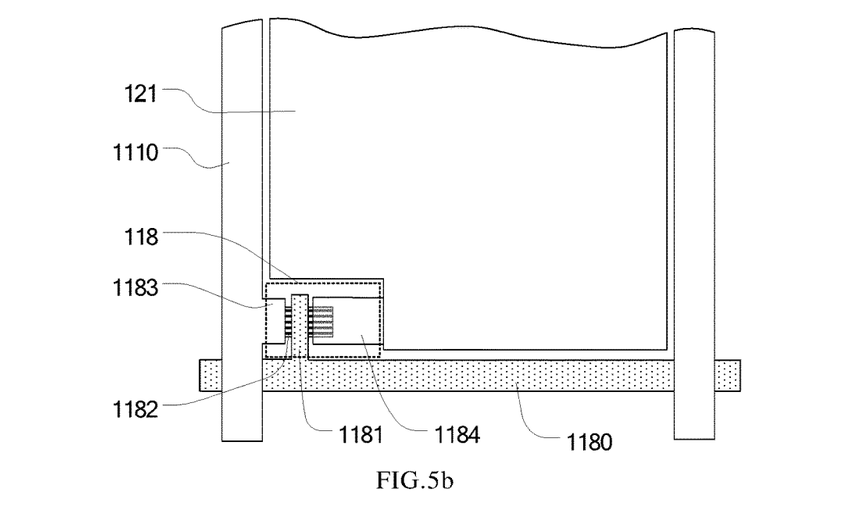
FIG. 5b is a schematic top view of gate lines and data lines in an array substrate.
Figure 6:
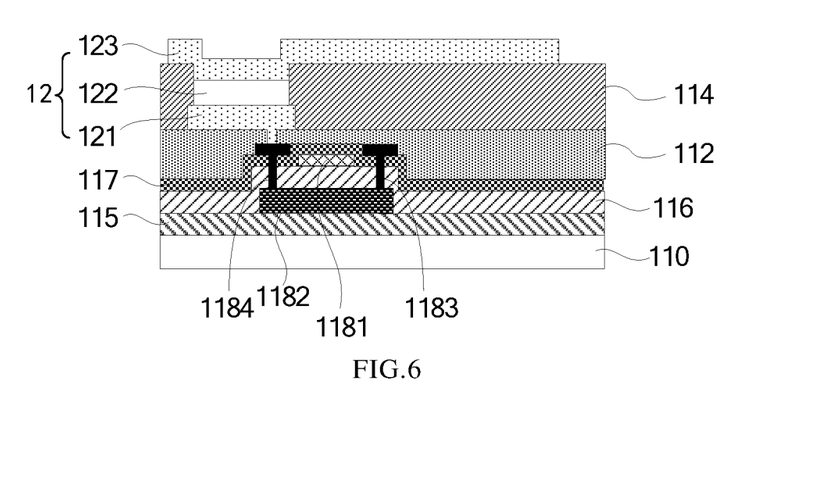
FIG. 6 is another vertical sectional view of a subpixel, in which a cathode layer is not electrically connected with a driver chip, and a corresponding array substrate thereof, provided by an embodiment of the present disclosure.

Illustratively, as illustrated in FIGS. 5a, 5b and 6, FIG. 5a is a vertical sectional view of a subpixel, in which a cathode layer is electrically connected with a driver chip through a conductive wire, and a corresponding array substrate thereof; FIG. 5b is a schematic top view of a gate line and data lines in the array substrate; and FIG. 6 is a vertical sectional view of a subpixel and an array substrate, in which a cathode layer is not electrically connected with a driver chip through a conductive wire.

For instance, as illustrated in FIG. 5a, the electric conductor 113 and the anode layer 121 of the subpixel 12 are arranged in the same layer and made from a same material. As the electric conductor and the anode layer of the subpixel are arranged in the same layer and made from a same material, the electric conductor and the anode layer of the subpixel are formed by the same patterning process, and hence the technological process of the touch display panel is further simplified.

For instance, as illustrated in FIG. 5a, the array substrate, corresponding to the subpixel in which the cathode layer is electrically connected with the driver chip through the conductive wire, further includes: a base substrate 110, a buffer layer 115, a gate insulating layer 116, an insulating interlayer 117, a thin film transistor 118 and a gate line (not shown in FIG. 5a). The buffer layer 115, the gate insulating layer 116 and the insulating interlayer 117 are disposed on the base substrate 110 in sequence; the thin film transistor 118 includes: a gate electrode 1181, an active layer 1182, a source electrode 1183 and a drain electrode 1184; the buffer layer 115 covers the base substrate 110; the active layer 1182 is disposed between the buffer layer 115 and the gate insulating layer 117; the gate electrode 1181 and the gate line are disposed between the gate insulating layer 116 and the insulating interlayer 117; and the conductive wire 111, the source electrode 1183, the drain electrode 1184 and the data line (not shown in FIG. 5a) are disposed between the planarization layer 112 and the insulating interlayer 117. As illustrated in FIG. 5b, the gate electrode 1181 is connected with the gate line 1180; the source electrode 1183 is connected with the data line 1110; as illustrated in FIGS. 5a and 5b, the drain electrode 1184 is connected with the anode layer 121 of the subpixel 12; and both the source electrode 1183 and the drain electrode 1184 are connected with the active layer 1182.

As illustrated in FIG. 6, the array substrate, corresponding to the subpixel 12 in which the cathode layer is not electrically connected with the driver chip, further includes: a base substrate 110, a buffer layer 115, a gate insulating layer 116, an insulating interlayer 117, a thin film transistor (not marked in FIG. 6) and a gate line (not shown in FIG. 6). The buffer layer 115, the gate insulating layer 116 and the insulating interlayer 117 are disposed on the base substrate 110 in sequence; the thin film transistor includes: a gate electrode 1181, an active layer 1182, a source electrode 1183 and a drain electrode 1184; the buffer layer 115 covers the base substrate 110; the active layer 1182 is disposed between the buffer layer 115 and the gate insulating layer 117; the gate electrode 1181 and the gate line are disposed between the gate insulating layer 116 and the insulating interlayer 117; the source electrode 1183, the drain electrode 1184 and the data line (not shown in FIG. 6) are disposed between the planarization layer 112 and the insulating interlayer 117; the gate electrode 1181 is connected with the gate line; the source electrode 1183 is connected with the data line; the drain electrode 1184 is connected with the anode layer 121 of the subpixel 12; and both the source electrode 1183 and the drain electrode 1181 are connected with the active layer 1182.

Figure 7:
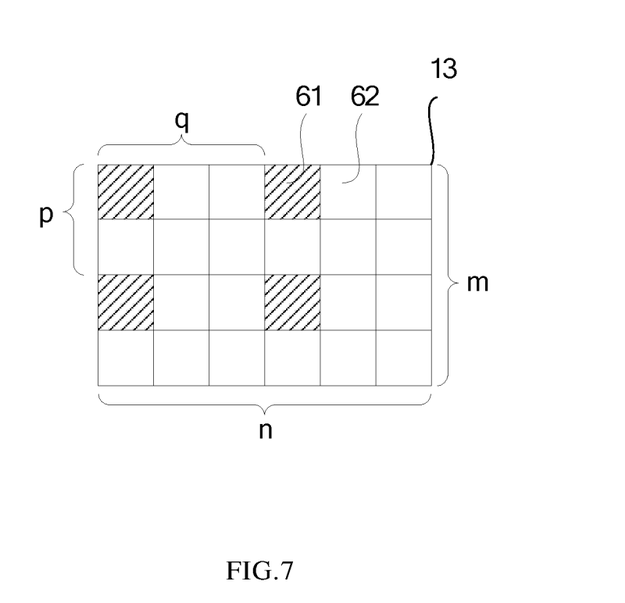
FIG. 7 is a schematic structural view of one subpixel group provided by an embodiment of the present disclosure.

Moreover, as illustrated in FIG. 7, a subpixel, the cathode layer of which is electrically connected with the driver chip through a conductive wire, is marked as 61, and a subpixel, the cathode layer of which is not electrically connected with the driver chip, is marked as 62. It should be noted that: the subpixel 61 as shown in FIG. 7, the cathode layer of which is electrically connected with the driver chip through the conductive wire, refers to that a position where the cathode layer of the subpixel 61 is electrically connected with the conductive wire is disposed in an area provided with the anode layer of the subpixel; and the subpixel 62 as shown in FIG. 7, the cathode layer of is not electrically connected with the driver chip, refers to that a position where the cathode layer of the subpixel 62 is electrically connected with the conductive wire is disposed outside the area provided with the anode layer of the subpixel. As illustrated in FIG. 7, one subpixel group 13 includes: m rows and n columns of subpixels. Taking the case that there is one subpixel 61 in each group of p rows and q columns as an example, the cathode layers of the subpixels in the (xp+1)th row and the (yq+1)th column are electrically connected with the driver chip respectively through conductive wires. Wherein, p and q are constants which are not zero; p is evenly divisible by m; q is evenly divisible by n; x and y are natural numbers; xp+1 is smaller than or equal to m; and yq+1 is smaller than or equal to n.

Description is given in FIG. 7 by taking the case that m is equal to 4, n being equal to 6, p being equal to 2, q being equal to 3, as an example. The embodiments of the present disclosure include, but not limited to, the embodiment as shown in FIG. 7.

Figure 8:
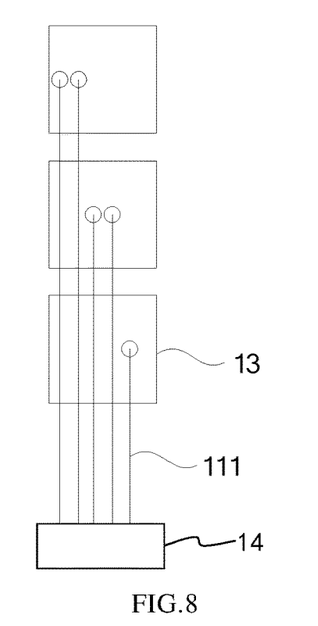
FIG. 8 is another schematic structural view of subpixel groups provided by an embodiment of the present disclosure.

It should be noted that the conductive wire 111 has a certain resistance and the touch drive signal suffers from certain loss during the process that the touch drive signal is transmitted along the conductive wire. Thus, for instance, each of the cathode layers of a plurality of subpixels disposed in one subpixel group 13 is electrically connected with the driver chip through at least one conductive wire. For instance, as illustrated in FIG. 8 (FIG. 8 only shows the cathode layers of 3 subpixels of the subpixel group, embodiments of the present disclosure include but not limited to FIG. 8), each of the cathode layers of a plurality of subpixels disposed in the same subpixel group 13 is electrically connected with the driver chip 14 through at least one conductive wire, and thus the cathode layers in each subpixel group 13 among at least partial subpixel groups 13 are electrically connected with the driver chip through a plurality of conductive wires 111. The plurality of the conductive wires 111 in parallel connection reduces the overall resistance of the conductive wires and hence reduces the loss of the touch drive signal during the conduction along the conductive wires 111 and improves the touch performance of the touch display panel.

In another aspect, the cathode layers in the subpixel group 13 also have certain resistance, and the touch drive signal suffers from certain loss during the conduction at the cathode layers in the subpixel group 13. Thus, for instance, the subpixels 61, the cathode layers of which are electrically connected with the driver chip through conductive wires respectively, in the subpixel group are uniformly distributed in the subpixel group 13, namely p is evenly divisible by m and q is evenly divisible by n. Thus, the loss of the touch drive signal during the conduction on the cathode layers in the subpixel groups is reduced, and hence the touch performance of the touch display panel is improved.

For instance, the number of the conductive wires respectively connected with the cathode layers in a subpixel group far away from the driver chip 14 is greater than the number of the conductive wires respectively connected with the cathode layers in a subpixel group close to the driver chip 14.

As for the subpixel group far away from the driver chip, corresponding conductive wires are longer; the resistance is larger; and the resulted signal loss is also severe. As for the subpixel group close to the driver chip, corresponding conductive wires are shorter; the resistance is smaller; and the resulted signal loss is less. Thus, more conductive wires are disposed in the subpixel group far away from the driver chip, and less conductive wires are be disposed in the subpixel group close to the driver chip.

It should be also noted that: as seen from the above embodiment, the subpixel group 13 including m rows and n columns of subpixels corresponds to n conductive wires at most, namely q is 1; at this point, the number of the conductive wires reaches an upper limit; and the loss of the touch drive signal during the conduction along the conductive wires is minimum. But more conductive wires affect the aperture opening ratio of the touch display panel and hence affect the brightness of the touch display panel. Thus, the number of the conductive wires is arranged by considering the loss of the touch drive signal and the brightness of the touch display panel.

In addition, the touch display panel provided by the embodiment of the present disclosure is a top-emission touch display panel or a bottom-emission touch display panel. In the case that the present disclosure is applied to the bottom-emission touch display panel, the conductive wires shield light emitted by the light-emitting layers, so that the aperture opening ratio of the touch display panel is affected. Therefore, preferably, the embodiment of the present disclosure is applied to the top-emission touch display panel.

Figure 9:
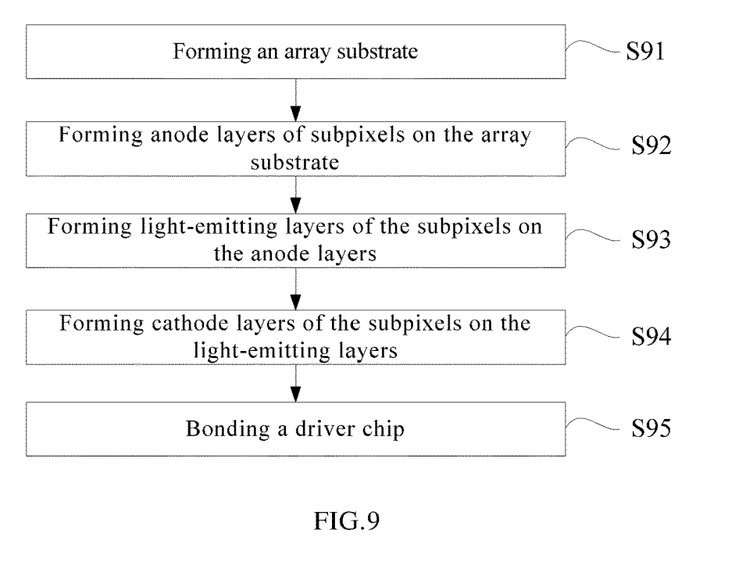
FIG. 9 is a flowchart of a method for manufacturing a touch display panel, provided by an embodiment of the present disclosure.

Still another embodiment of the present disclosure provides a method for manufacturing a touch display panel. The method for manufacturing the touch display panel for example is used for manufacturing the touch display panel provided by any one of foregoing embodiments. As illustrated in FIG. 9, the method includes the following steps S91 to S95.

Step S91: forming an array substrate.

Step S92: forming anode layers of subpixels, which are arranged in a matrix, on the array substrate, so that the anode layers of the subpixels are independent from each other.

Step S93: forming light-emitting layers of the subpixels respectively on the anode layers.

Step S94: forming cathode layers of the subpixels on the light-emitting layers to form the subpixels, so that one subpixel group is formed by at least two adjacent subpixels, the cathode layers of the subpixels in the same subpixel group are connected with each other, and the cathode layers of the subpixels in different subpixel groups are not connected.

Step S95: bonding a driver chip to the array substrate, so that the driver chip is electrically connected with the cathode layer of at least one subpixel in the subpixel group through a conductive wire.

In the method, in the display period of one frame, the driver chip is configured to output a common voltage signal to the cathode layers in each subpixel group; and in the touch period of one frame, the driver chip is configured to output a touch drive signal to the cathode layers in each subpixel group.

For example, the steps S91, S92, S93 and S94 are finished by patterning processes. For instance, one patterning process generally includes: cleaning, film forming, photoresist coating, exposure, development, etching, photoresist stripping, etc. As for metallic layers, physical vapor deposition (PVD) (e.g., magnetron sputtering) is usually adopted for film forming, and patterns are formed by wet etching. As for non-metallic layers, chemical vapor deposition (CVD) is generally adopted for film forming, and patterns are formed by dry etching.

In the method for manufacturing the touch display panel, provided by the embodiment of the present disclosure, firstly, the array substrate is formed; secondly, the anode layers of the subpixels are formed on the array substrate; thirdly, the light-emitting layers of the subpixels are formed on the anode layers; fourthly, the cathode layers of the subpixels are formed on the light-emitting layers; and finally, the driver chip is bonded. The anode layers of the subpixels are independent from each other; one subpixel group is formed by at least two adjacent subpixels; the cathode layers of the subpixels in the same subpixel group are connected with each other; the driver chip is electrically connected with the cathode layer of at least one subpixel in the subpixel group through a conductive wire; in the display period of one frame, the driver chip is configured to output a common voltage signal to the cathode layers in each subpixel group; and in the touch period of one frame, the driver chip is configured to output a touch drive signal to the cathode layers in each subpixel group. In the embodiment of the present disclosure, in the touch period of one frame, the cathode layers in each subpixel group are multiplexed as a touch electrode. Compared with the proposal that the touch electrodes are formed at the outside of the encapsulated layer of the display panel, the embodiment of the present disclosure omits the technological process of independently forming the touch electrodes. Therefore, the embodiment of the present disclosure simplifies the manufacturing process of the touch display panel and reduces the manufacturing costs of the touch display panel.

For instance, the process of forming the array substrate in the step S91 includes: forming a data line of the array substrate, so that the conductive wire and the data line are formed by the same patterning process. As the conductive wire and the data line are formed by the same patterning process, the technological process of the touch display panel is simplified.

Optionally, for instance, the process of forming the array substrate in the step S91 further includes: forming a planarization layer covering the data line and the conductive wire; forming a pixel defining layer covering the planarization layer; and forming a through hole running through the planarization layer and the pixel defining layer, so that the cathode layer of the subpixel is connected with the conductive wire via the through hole.

Optionally, for instance, the process of forming the array substrate in the step S91 further includes: forming a planarization layer covering the data line and the conductive wire; forming a first through hole in the planarization layer; forming an electric conductor on the planarization layer provided with the first through hole, with the electric conductor connected with the conductive wire via the first through hole; forming a pixel defining layer covering the electric conductor; and forming a second through hole in the pixel defining layer, with the cathode layer of the subpixel is connected with the electric conductor via the second through hole.

For instance, the electric conductor and the anode layers of the subpixels are formed by the same patterning process.

For instance, the electric conductor is an island electric conductor. Of course, the electric conductor may also be in other shapes, e.g., be strip-shaped.

As the electric conductor and the anode layers of the subpixels are formed by the same patterning process, the technological process of the touch display panel is further simplified.

For instance, the process of forming the array substrate in the step S91 further includes: forming a buffer layer on a base substrate; forming an active layer on the buffer layer; forming a gate insulating layer covering the active layer; forming a gate electrode and a gate line on the gate insulating layer, with the gate electrode is connected with the gate line; forming an insulating interlayer covering the gate electrode and the gate line; and forming a source electrode, a drain electrode and the data line on the insulating interlayer, with the source electrode connected with the data line and both the source electrode and the drain electrode connected with the active layer.

Figure 10:
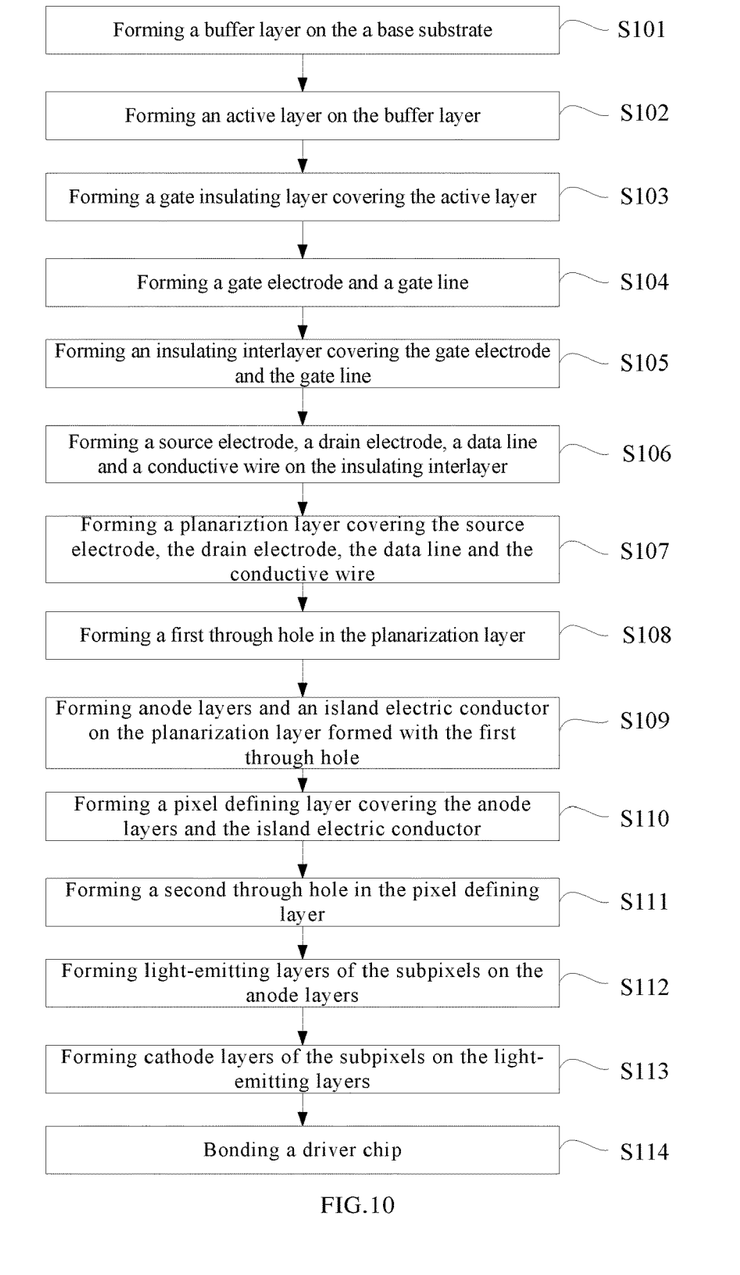
FIG. 10 is a flowchart of another method for manufacturing a touch display panel, provided by an embodiment of the present disclosure.

In summary, for instance, as illustrated in FIG. 10, the method for manufacturing the touch display panel includes the following steps S101 to S114.

S101: forming a buffer layer on a base substrate.

S102: forming an active layer on the buffer layer.

S103: forming a gate insulating layer covering the active layer.

S104: forming a gate electrode and a gate line on the gate insulating layer.

S105: forming an insulating interlayer covering the gate electrode and the gate line.

S106: forming a source electrode, a drain electrode and a data line on the insulating interlayer, and simultaneously forming a conductive wire.

S107: forming a planarization layer covering the source electrode, the drain electrode, the data line and the conductive wire.

S108: forming a first through hole in the planarization layer, in which the position of the first through hole corresponds to the position of the conductive wire.

S109: forming anode layers and an electric conductor on the planarization layer provided with the first through hole.

S110: forming a pixel defining layer covering the anode layers and the electric conductor.

S111: forming a second through hole in the pixel defining layer, in which the position of the second through hole corresponds to the position of the electric conductor.

S112: forming the light-emitting layers of subpixels on the anode layers.

S113: forming the cathode layers of the subpixels on the light-emitting layers.

S114: bonding a driver chip.

Optionally, for instance, the subpixel group includes: m rows and n columns of subpixels; and the cathode layers of the subpixels in the (xp+1)th row and the (yq+1)th column are respectively electrically connected with the driver chip through conductive wires, in which p and q are constants; p is evenly divisible by m; q is evenly divisible by n; x and y are natural numbers; xp+1 is smaller than or equal to m; and yq+1 is smaller than or equal to n.

Optionally, for instance, the number of the conductive wires respectively connected with the cathode layers in a subpixel group far away from the driver chip is greater than the number of the conductive wires respectively connected with the cathode layers in a subpixel group close to the driver chip.

Still another embodiment of the present disclosure provides a method for driving a touch display panel. The driving method for example is used for driving the touch display panel provided by any one of foregoing embodiments or the touch display panel manufactured by foregoing method for manufacturing the touch display panel. The driving method includes: dividing the time period of each frame into a display period and a touch period; in the display period, allowing the driver chip to output a common voltage signal to the cathode layers in each subpixel group; and in the touch period, allowing the driver chip to output a touch drive signal to the cathode layers in each subpixel group and determine the touch position according to the capacitance variation of the cathode layers in each subpixel group.

For instance, the method for driving the touch display panel, provided by the embodiment of the present disclosure, adopts the self-capacitance technology, namely in the touch period, the driver chip is configured to apply the touch drive signal to the cathode layers in each subpixel group and receive a feedback touch sensing signal, and subsequently, the driver chip is configured to determine the touch position according to the variation of the touch sensing signal relative to the touch drive signal.

In the method for driving the touch display panel, provided by the embodiment of the present disclosure, firstly, the time period of each frame is divided into a display period and a touch period; and secondly, in the display period, a common voltage signal is outputted to the cathode layers in each subpixel group, and in the touch period, a touch drive signal is outputted to the cathode layers in each subpixel group and a touch position is determined according to the capacitance variation of the cathode layers in each subpixel group. In the embodiment of the present disclosure, in the touch period of one frame, the cathode layers in each subpixel group are multiplexed as a touch electrode. Compared with the proposal that the touch electrodes are formed at the outside of the encapsulated layer of the display panel, the embodiment of the present disclosure omits the technological process of independently forming the touch electrodes. Therefore, the embodiment of the present disclosure simplifies the manufacturing process of the touch display panel and reduces the manufacturing costs of the touch display panel.

Still another embodiment of the present disclosure provides a touch display device, which includes the touch display panel provided by any one of foregoing embodiments or the touch display panel manufactured by the method for manufacturing the touch display panel, provided by any one of foregoing embodiments.

For instance, the touch display device is any product or component with touch function and display function such as e-paper, a mobile phone, a tablet PC, a TV, a display, a notebook computer, a digital picture frame and a navigator. Limitations are not imposed to the touch display device in the text, as long as the touch display device includes the touch display panel provided by any one of the embodiments.

The embodiments of the touch display panel, the manufacturing method thereof, the driving method thereof and the touch display device refer to each other.

What are described above is the illustrative embodiments of the present disclosure only and not limitative to the scope of the disclosure, and variations and modifications, easily made by those skilled in the relevant art within the technical scope of the present disclosure, belong to the scope of the present disclosure. Therefore, the scopes of the disclosure are defined by the accompanying claims.

This application claims the benefit of Chinese Patent Application No. 201510526143.0, filed on Aug. 24, 2015, which is hereby entirely incorporated by reference as a part of the present application.

What is claimed is:

1. A touch display panel, comprising:
an array substrate;
a plurality of subpixels arranged in a matrix and disposed on the array substrate, wherein each subpixel comprises an anode layer, a light-emitting layer and a cathode layer which are sequentially disposed on the array substrate; the anode layers of the subpixels are independent from each other; at least two adjacent subpixels form a subpixel group; and the cathode layers of the subpixels in a same subpixel group are connected with each other, and the cathode layers of the subpixels in different subpixel groups are not connected; and
a driver chip configured to output a signal to the cathode layers in each subpixel group, wherein
the driver chip is electrically connected with the cathode layer of at least one subpixel in each subpixel group through a conductive wire;
in a display period of a frame, the driver chip is configured to output a common voltage signal to the cathode layers in each subpixel group; and in a touch period of the frame, the driver chip is configured to output a touch drive signal to the cathode layers in each subpixel group.

2. The touch display panel according to claim 1, wherein the array substrate comprises a data line; and the data line of the array substrate and the conductive wire are arranged in a same layer and made from a same material.

3. The touch display panel according to claim 2, wherein the array substrate further comprises: a planarization layer covering the conductive wire and a pixel defining layer covering the planarization layer; and
the cathode layer of the subpixel is connected with the conductive wire via a through hole running through the planarization layer and the pixel defining layer.

4. The touch display panel according to claim 2, wherein the array substrate further comprises: a planarization layer covering the conductive wire, an electric conductor disposed on the planarization layer, and a pixel defining layer covering the electric conductor; and
the electric conductor is connected with the conductive wire via a first through hole in the planarization layer, and the cathode layer of the subpixel is connected with the electric conductor via a second through hole in the pixel defining layer.

5. The touch display panel according to claim 4, wherein the electric conductor and the anode layers of the subpixels are arranged in a same layer and made from a same material.

6. The touch display panel according to claim 4, wherein the array substrate further comprises: a base substrate, a buffer layer, a gate insulating layer, an insulating interlayer, a thin-film transistor and a gate line;
the buffer layer, the gate insulating layer and the insulating interlayer are disposed on the base substrate in sequence; the thin film transistor comprises: a gate electrode, an active layer, a source electrode and a drain electrode;
the buffer layer covers the base substrate; the active layer is disposed between the buffer layer and the gate insulating layer; the gate electrode and the gate line are disposed between the gate insulating layer and the insulating interlayer; the conductive wire, the source electrode, the drain electrode and the data line are disposed between the planarization layer and the insulating interlayer; the gate electrode is connected with the gate line; the source electrode is connected with the data line; the drain electrode is connected with the anode layer; and both the source electrode and the drain electrode are connected with the active layer.

7. The touch display panel according to claim 4, wherein the electric conductor is an island electric conductor.

8. The touch display panel according to claim 1, wherein the subpixel group comprises m rows and n columns of the subpixels; and the cathode layers of the subpixels in a $(xp+1)^{th}$ row and a $(yq+1)^{th}$ column are electrically connected with the driver chip through conductive wires respectively,
wherein each of p and q is a constant; p is evenly divisible by m; q is evenly divisible by n; each of x and y is a natural number; xp+1 is smaller than or equal to m; and yq+1 is smaller than or equal to n.

9. The touch display panel according to claim 1, wherein a number of the conductive wires respectively connected with the cathode layers in the subpixel group far away from the driver chip is greater than a number of the conductive wires respectively connected with the cathode layers in the subpixel group close to the driver chip.

10. A touch display device, comprising the touch display panel according to claim 1.

11. The touch display panel according to claim 1, wherein in the touch period of the frame, the cathode layers in each subpixel group are used as a touch electrode.

* * * * *